United States Patent
Henry et al.

(10) Patent No.: US 11,943,619 B2
(45) Date of Patent: Mar. 26, 2024

(54) OPENROAMING AUGMENTATION METHOD FOR EAP FAILURES

(71) Applicant: Cisco Technology, Inc., San Jose, CA (US)

(72) Inventors: Jerome Henry, Pittsboro, NC (US); Bart Brinckman, Nevele (BE); Mark Grayson, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 17/388,267

(22) Filed: Jul. 29, 2021

(65) Prior Publication Data
US 2022/0141665 A1     May 5, 2022

Related U.S. Application Data

(60) Provisional application No. 63/106,928, filed on Oct. 29, 2020.

(51) Int. Cl.
*H04W 12/08*     (2021.01)
*H04W 12/04*     (2021.01)
(Continued)

(52) U.S. Cl.
CPC ......... *H04W 12/086* (2021.01); *H04W 12/06* (2013.01)

(58) Field of Classification Search
CPC ............... H04W 12/086; H04W 12/06; H04W 12/08; H04L 63/08; H04L 63/10
See application file for complete search history.

(56) References Cited

U.S. PATENT DOCUMENTS

| 2005/0153684 | A1 | 7/2005 | Rodrigo |
| 2007/0118883 | A1* | 5/2007 | Potter ............... H04L 69/24 |
| | | | 713/182 |

(Continued)

FOREIGN PATENT DOCUMENTS

| CN | 101621799 A | 1/2010 |
| CN | 101075869 A | 1/2012 |

(Continued)

OTHER PUBLICATIONS

Yuki Atsuya; Souheil Ben Ayed; Fumio Teraoka; "Network Access Authentication Infrastructure Using EAP-TTLS on Diameter EAP Application"; AINTEC '11: Proceedings of the 7th Asian Internet Engineering Conference; Nov. 9, 2011; pp. 56-63 (Year: 2011).*

(Continued)

*Primary Examiner* — Fatoumata Traore
*Assistant Examiner* — Courtney D Fields
(74) *Attorney, Agent, or Firm* — Polsinelli P.C.

(57) ABSTRACT

The presently claimed disclosure is directed to methods that may be implemented at a computer. Methods and systems consistent with the present disclosure may include extending protocols associated with authenticating client (i.e. supplicant) devices and with authorizing those supplicant devices to access a wireless network. These methods may include sending data relating to the failure of an authentication and/or an authorization process to a supplicant device attempting to access a wireless network. Methods discussed within may include securely sending failure codes or reasons to a supplicant device that identify why an authentication or authorization process failed. These methods may include sending messages between a supplicant device, an authenticator device, and an authentication and authorization server. After a first failure, the supplicant device may be able (Continued)

to access the wireless network after a reason or code of that failure has been reported to the supplicant device.

20 Claims, 8 Drawing Sheets

(51) Int. Cl.
  *H04W 12/06* (2021.01)
  *H04W 12/086* (2021.01)
  *H04W 84/12* (2009.01)

(56) References Cited

U.S. PATENT DOCUMENTS

| 2007/0180229 A1* | 8/2007 | Salowey | H04L 9/3263 |
| | | | 713/173 |
| 2012/0005727 A1 | 1/2012 | Lee et al. | |
| 2017/0118638 A1* | 4/2017 | Zhang | H04W 12/068 |
| 2020/0068391 A1* | 2/2020 | Liu | H04L 63/162 |

FOREIGN PATENT DOCUMENTS

| EP | 2957114 B1 * | 12/2016 | H04L 63/0853 |
| EP | 3151599 A1 * | 4/2017 | H04L 63/0853 |
| EP | 3151599 A1 | 4/2017 | |
| WO | 2013097686 | 7/2013 | |

OTHER PUBLICATIONS

International Search Report and Written Opinion for PCT Application No. PCT/US2021/053630 dated Jan. 17, 2022, 9 pages.
English translation of Chinese Application No. CN101621799A, 7 pages.
English translation of Chinese Application No. CN101075869A, 7 pages.

* cited by examiner

OPENROAMING AUGMENTATION METHOD FOR EAP FAILURES

CROSS-REFERENCE TO RELATED APPLICATIONS

This application claims priority to U.S. Provisional Patent Application No. 63/106,928, filed on Oct. 29, 2020, entitled "Openroaming Augmentation Method for EAP Failures," the content of which is incorporated herein by reference in its entirety.

TECHNICAL FIELD

The present disclosure generally relates to network equipment and services. More specifically the present disclosure relates the authentication and authorization of devices attempting to access network services through a wireless network.

BACKGROUND

Networking architectures have grown increasingly complex in communications environments, particularly mobile networking environments. OpenRoaming® has revolutionized Institute of Electrical and Electronics Engineers (IEEE) 802.11 (e.g., Wi-Fi®) roaming. In some instances, authentication and authorization failures can present challenges for an OpenRoaming architecture. Specifically, when an authentication and/or an authorization process fails, a device attempting to communicate via the wireless network is not information why either of both the authentication and authorization processes failed.

Today, wireless networks commonly use encrypted communications. These wireless networks, however, still do not support communicating reasons that identify why authentication and/or authorization of a device fails. This commonly results in numerous devices repetitively attempting to pass an authentication and/or authorization process. Sometimes these repetitive attempts result in a loop of trials, where an authentication and/or authorization process continuously fails. Such a repetitive process is very inefficient as it makes computing devices perform unnecessary tasks that waste network bandwidth.

DESCRIPTION OF EXAMPLE EMBODIMENTS

Figure 1:
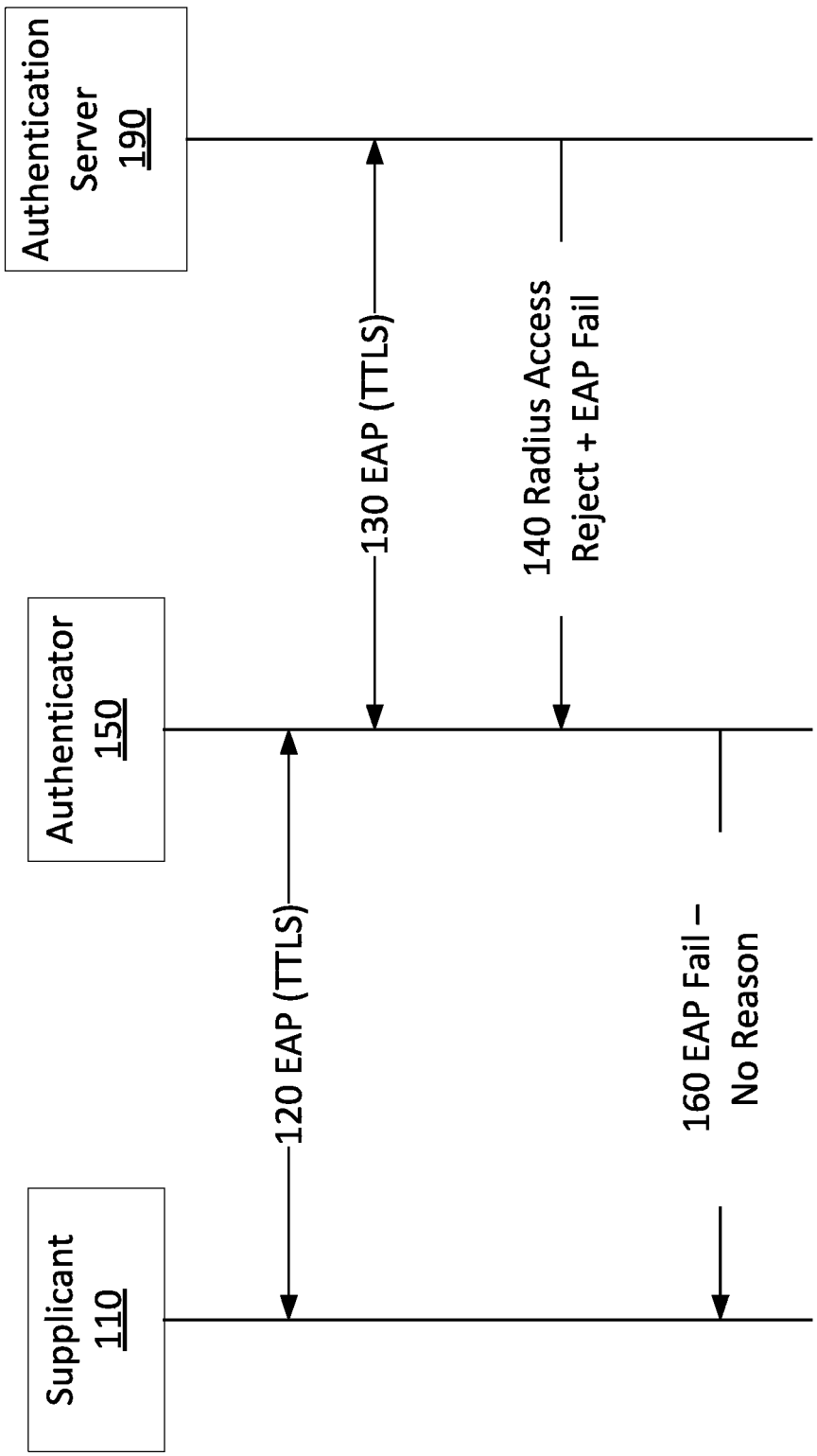
FIG. 1 is a message sequence diagram for a call flow illustrating example details that may be associated with authentication and authorization failures in an Extensible Authentication Protocol (EAP) framework.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The presently claimed disclosure is directed to methods that may be implemented at a computer. Methods and systems consistent with the present disclosure may include extending protocols associated with authenticating client (i.e. supplicant) devices and with authorizing those supplicant devices to access a wireless network. These methods may include sending data relating to the failure of an authentication and/or an authorization process to a supplicant device attempting to access a wireless network. Methods discussed within may include securely sending failure codes or reasons to a supplicant device that identify why an authentication or authorization process failed. These methods may include sending messages between a supplicant device, an authenticator device, and an authentication and authorization server. Functions of the authenticator device may be implemented at an access point of a wireless network. After a first failure, the supplicant device may be able to access the wireless network after a reason or code of that failure has been reported to the supplicant device.

The presently claimed technology may include a computer implemented method, a system, or a non-transitory computer readable storage medium that improves the efficiency of a wireless network.

Techniques presented herein define new reasons for an Identity Provider (IdP) rejecting a supplicant in the context of a Federation. Further defined herein are 3 methods for the rejection reason to be transmitted to a user equipment (UE), thus avoiding that the UE would retry profiles that would always fail, and thus allowing the UE to better arbitrate between retry, wait, switch profile or switch Service Set Identifier (SSID). Techniques discussed herein may be inserted into Wi-Fi Alliance Passpoint and other applicable 802.11 standards. The supplicant may be a computing device that attempts to join a wireless network.

In a first embodiment, a method of the present invention technology includes receiving at a computer an Extensible Authentication Protocol (EAP) request that was generated at a supplicant device when that supplicant device is attempting to access network services via a network environment. This method may also include the computer identifying that the supplicant has failed either or both authentication for the network environment and authorization for the network environment that were initiated based on receipt of the EAP request by the computer. After either or both the authentication or authorization failure is identified, the computer may facilitate transmission of a messaged to the supplicant. This message may include a failure indication that may include one or more reasons why the either or both of the authentication or authorization failure occurred.

In a second embodiment, a system of the present disclosure includes one or more processors and at least one computer-readable storage medium that stores instructions executable by the one or more processors to perform operations that include receiving an EAP request that was generated at a supplicant device when that supplicant device is attempting to access network services via a network environment. The execution of the instructions by the one or more processors may also result in identifying that the supplicant has failed either or both authentication for the network environment and authorization for the network environment that were initiated based on receipt of the EAP request. After either or both the authentication or authorization failure is identified, the transmission of a messaged to the supplicant may be facilitated. This message may include a failure indication that may identify one or more reasons why the either or both of the authentication or authorization failure occurred.

In a third embodiment, a method consistent with the present disclosure may be implemented by a non-transitory computer readable storage medium that stores instructions that when executed by a processor cause the processor to perform operations that include receiving an EAP request that was generated at a supplicant device when that supplicant device is attempting to access network services via a network environment. The execution of the instructions by the processor may also result in identifying that the supplicant has failed either or both authentication for the network environment and authorization for the network environment that were initiated based on receipt of the EAP request. After either or both the authentication or authorization failure is identified, the transmission of a message to the supplicant may be facilitated. This message may include a failure indication that may identify one or more reasons why the either or both of the authentication or authorization failure occurred.

Description

In a standard WiFi 802.1X network and in a standard offload to a Passpoint network, the local venue (e.g., an Access Network Provider (ANP)) connects to a single Identity Provider (IdP) source, typically allowing a single authentication and authorization method. Users attempting to connect with a pre-set profile are expected to succeed unless the connection is a first attempt and the exchange encounters a configuration issue (e.g., wrong password, etc.).

As such, authentication and authorization failures have limited perimeters in current deployments. As the exchange between a device and an Authentication server partially occurs over the air, before encryption keys have been agreed upon, the result of the failure is the authenticator (e.g., an access point (AP)) sending an EAP Failure message. To avoid providing too much usable information to a potential attacker, the EAP message (as per Request For Comments (RFC) 3748) does not contain any reason code. The result of such current operations is that an end device does not receive through the EAP message detailed information about the reason of the failure.

This structure collapses in the context of a federation (e.g. OpenRoaming™ (OR)) such that a device may have dozens of possible profiles for a given network. Yet, upon receiving an EAP Failure, the device is unable to determine if the rejection comes from a timeout, another temporal failure, an unsuitability of that profile (yet valid in other networks) with that ANP, a lack of service subscription, insufficient credit, e.g. if the service is chargeable at that time, or other applicable authorization or accounting related issues. The result is that the device has no choice but to treat the failure the same way it treats timeouts or other failures: by immediately retrying. The outcome is that device endlessly retries profiles for which credentials are invalid, or for a service not authorized and never switches to other (possible but lower in the device priority list) profiles, thereby consuming airtime and wireless network bandwidth with no favorable outcome.

Another issue is that the reasons for failures (in the context of a federation) may largely span beyond the simple 'wrong password' failures. The relations between an IdP, an ANP and a user may be complex, and failures may occur because of lack of mutual approval between the ANP and the IdP, lack of acceptable Service Level Agreement (SLA) in this ANP (from the IdP perspective, possibly paying for the Wi-Fi offload) and much more.

Thus, there is a need for a method that can expand the causes for EAP failures to accommodate federation uses cases, but also that can securely provide the failure reasons to the end device, so that the device can decide of a better course of action (e.g., wait, switch to another profile, request different SLA, etc.)

FIG. 1 is a message sequence diagram for a call flow illustrating example details that may be associated with authentication and authorization failures in an EAP flow illustrating example details that may be associated with authentication failures in an EAP framework.

Authentication, as used herein, includes verifying an identity of a client attempting to access a network. Authorization, as used herein, includes granting the client access to one or more network services through the network. In the context of a Wi-Fi network, several protocols can be encapsulated into the EAP exchange framework (e.g., EAP-TLS [EAP-Transport Layer Security], EAP-TTLS [EAP-Tunneled TLS], EAP-SIM/AKA/AKA' [EAP-Subscriber Identity Module]/[EAP-Authentication and Key Agreement]/[Improved EAP-AKA]). At the end of the authentication phase (that may be successful), the Authentication, Authorization and Accounting (AAA) server proceeds through the authorization examination.

FIG. 1 illustrates a series of communications that are sent between computing devices of a supplicant computing device 110, an authenticator device 150, and an authentication & accounting (AAA) server 190. Here the supplicant device 110 may be a computing device of any sort (e.g. a desktop computer, a notebook computer, a tablet, or a cell phone) that sends an EAP message 120 to authenticator device 150. This message may be an EAP tunneled transport layer security (EAP-TTLS) message. Authenticator 150 may then send a message 130 (i.e. an EAP-TTLS message) to AAA server 190 after which the AAA server 190 performs an authentication function. Upon a failure, the AAA server returns a Remote Authentication Dial-In User Service (RADIUS) Access-Reject message 140, accompanied with an EAP-Failure message (protocol-specific variations are examined below). The authenticator 150 then sends (over the air, thus over an unprotected medium) the EAP-Failure message 160 to the supplicant so as to close the connection. Conventionally, EAP failure message 160 includes no reason that identifies why the authentication process failed. The supplicant 110 thus does not learn through the EAP process the real reason of the failure (and, in current usage, ends up simply retrying ad infinitum).

Techniques presented herein define new reasons for an IdP rejecting a supplicant in the context of a Federation. Further defined herein are 3 methods for the rejection reason to be transmitted to a UE, thus avoiding that the UE would retry profiles that would always fail, and thus allowing the UE to better arbitrate between retry, wait, switch profile or switch SSID.

Consider various example details associated with the methods presented herein, which may be discussed as follows:

Part A. Augment the failure reasons that can cause a failure with a set of new reasons that are applicable to authentication and/or authorization.

Part B. Presents three methods to provide the failure reason to the supplicant, so the supplicant can decide if the best course of action is to switch to the next profile, wait, or retry to another action.

Part A. In a federation environment, with multiple possible "Identity Providers" (IdPs), there may be loose coupling between a Wi-Fi venue owner and an IdP. Thus, choreography is more complex than with a single direct Hotspot-SP relationship. As such, there is a need for an augmented set of novel reasons for failures that can be passed from the IdP/AAA to the ANP/authenticator and to the supplicant (as discussed in Part B, below). Thus, the following additional failure reasons can be defined:

notification-request-data=[displayable-string]%x00 [network-info]

displayable-string=*CHAR network-Info="Failure-Cause=" cause-code cause-code="01"; authentication failed cause-code=/"02"; failure before authentication cause-code=/"03"; authorization rejected–no service subscription cause-code=/"04"; authorization rejected–roaming not allowed in this network cause-code=/"05"; authorization rejected–QoS (quality of service) not acceptable cause-code=/"06"; authorization rejected–no credit cause-code=/"07"; authorization rejected–temporary denial The format can naturally be adapted to the structure of the proposal below (e.g., integrated into Transport Layer Security (TLS) Alert messages having a format following the current Alert message structure). Further, other cause codes can be envisioned.

Part B, Method 1. EAP Failures do not include reason codes as an eavesdropper/attacker can use this information to collect information about the client. In a network implementing Pre-Association Security Negotiation (PASN) or other form of pre-association security (e.g. a form of non-robust association security), Method 1 defines a mechanism that allows the EAP Authenticator to provide an EAP peer with a rejection cause hint, independently of EAP method. OWE allows encrypted communications to be setup between devices without using an authentication process, for example, by use of a Diffie-Hellman key exchange.

This information is sent to the peer in an EAP-Notification/Request message by appending it after the displayable message. The message can include a NUL character and/or other applicable character(s) after which the information can be appended. The EAP authenticator may send a failure cause hint to the peer in an EAP-Notification/Request message. The reception of a failure cause hint is not to be used by an EAP peer to infer that an EAP authentication has failed. If an EAP peer receives an EAP Success code after having received a failure cause hint, then it is to ignore the received failure cause information.

The failure cause hint information is placed after the displayable string and a NUL character in the EAP-Notification/request. The above (in Part A) Augmented Backus-Naur Form (ABNF) [RFC4234] defines the Failure-Cause attribute for presenting the failure cause hint information. The attribute's value consists of a set of a cause-code.

The notification hint is sent before the EAP Failure, over the protected link to the UE. Because the link is protected (PASN/OWE), an eavesdropper cannot use the rejection information to glean information about the supplicant. Various example details associated with Method 1 are illustrated with reference to the call flow of FIG. 2.

Figure 2:
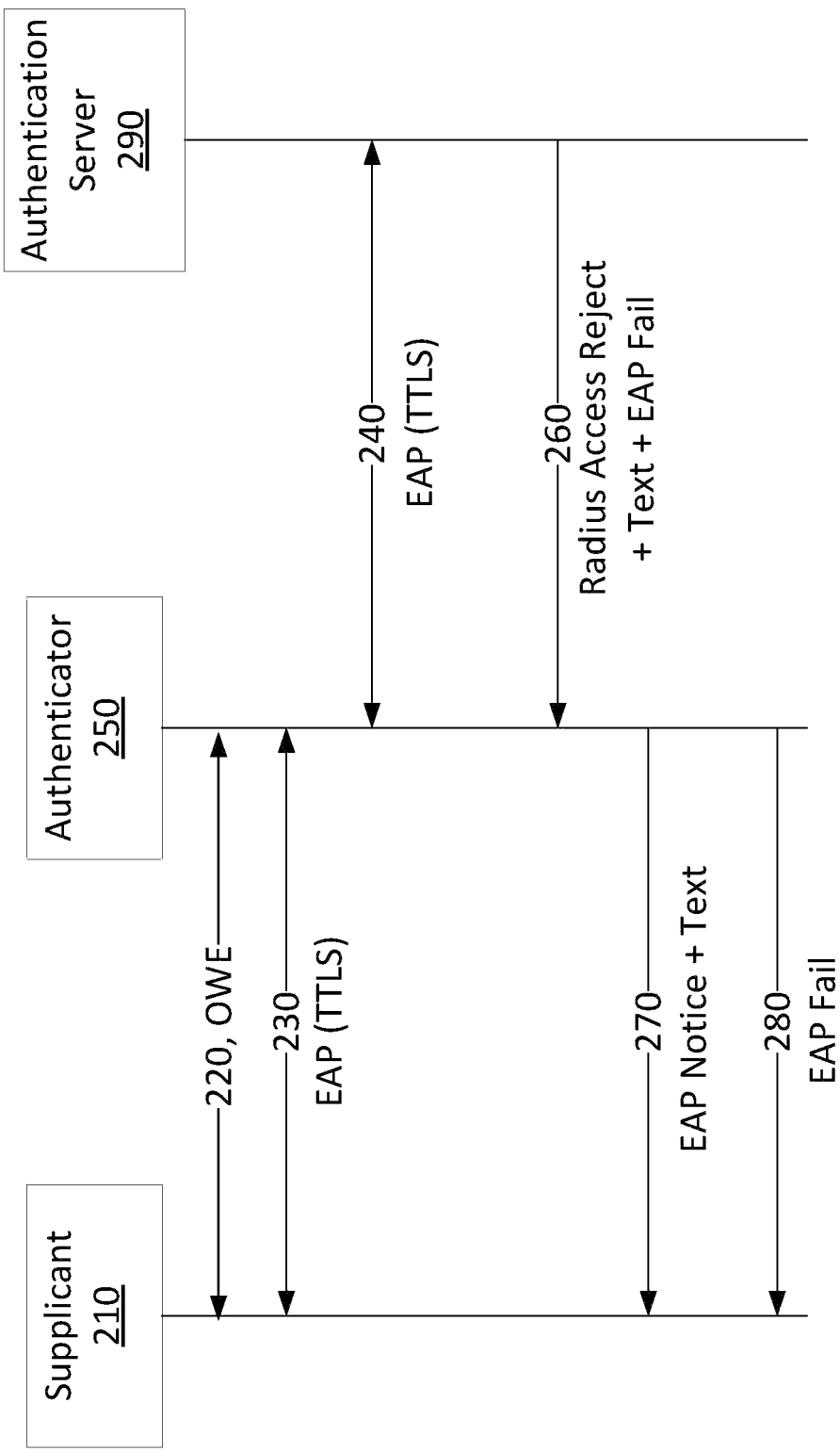
FIG. 2 is a message sequence diagram for a call flow illustrating example details that may be associated with an augmentation method for EAP failures, according to an example embodiment.

FIG. 2 is a message sequence diagram for a call flow illustrating example details that may be associated with an augmentation method for EAP failures, according to an example embodiment. Like FIG. 1, FIG. 2 also includes a supplicant device 210, an authenticator 250 and accounting serer (AAA) 290. Here in FIG. 2, however, the messages passed between supplicant 210, authenticator 250, and AAA server 290 are slightly different than the messages discussed in respect to FIG. 1. A first set of messages 220 establish opportunistic wireless encrypted communications between supplicant 210 and authenticator device 250. Next, EAP-TTLS message 230 may be sent to authenticator and EAP-TTLS message 240 may be sent to AAA server 290. After the AAA server attempts to authenticate supplicant 210, message 260 may be sent to Authenticator 250. FIG. 2 illustrates that this message is a (RADIUS) access-reject message that may be accompanied by text and an EAP failure message.

After authenticator 250 receives message 260, authenticator 250 may send message 270 that includes an EAP notification message and the text of message 260. Message 270 includes an authentication failure "hint" (i.e. information that the supplicant can use to potentially identify a reason why an authentication failed). Since message 270 is encrypted, an eavesdropper is unable to see and interpret the information included in message 270. After message 270 is sent, authenticator 250 sends EAP failure message 280 to supplicant 210.

By receiving the failure "hint" the supplicant 210 may attempt access the wireless network again. At this time supplicant 210 may provide information in subsequent messages that is different from information associated with the previously failed authentication process. Differences in this second attempt to access a wireless network may have based on the information that the failure "hint" provided the supplicant 210.

Part B, Method 2. In cases where Method 1 is not suitable (e.g., no OWE/PASN), Method 2 can include augmenting the Passpoint specification, individual RFCs:

https://tools.ietforg/html/rfc3748; https://tools.ietforg/html/rfc8110;
https://tools.ietforg/html/rfc5216; https://tools.ietforg/html/rfc5246;
https://tools.ietforg/html/rfc5281; https://tools.ietforg/html/draft-rfced-info-zorn-01;
https://tools.ietforg/html/rfc2548; and https://tools.ietforg/html/rfc4186, as well as 802.11 (9.4.1.7), namely EAP, OWE, EAP-TLS, EAP-TTLS and EAP-SIM/AKA to insert a failure reason into the existing EAP choreography.

In particular, RFC 5256 Annex 3 can be augmented to increase the Alert message perimeter, and insert the reasons codes in Part A. As per RFC 5246, the AAA server can now send an EAP-TLS Request message to the supplicant (via a protected tunnel) of the Alert type. The alert indicates one or more of the augmented failure reasons. This allows the supplicant to know new reasons caused by authentication issues, but also failures due to authorization issues between the IdP and the ANP parameters. The supplicant replies with an empty EAP-TLS response to acknowledge the failure and its reason. The AAA server then sends the Access-Reject+EAP Failure to the authenticator, who replays the EAP-Failure message to the supplicant as per current usage. Various example details associated with such augmenting for Method 2 involving RFC 5246 are illustrated with reference to the call flow of FIG. 3.

Figure 3:
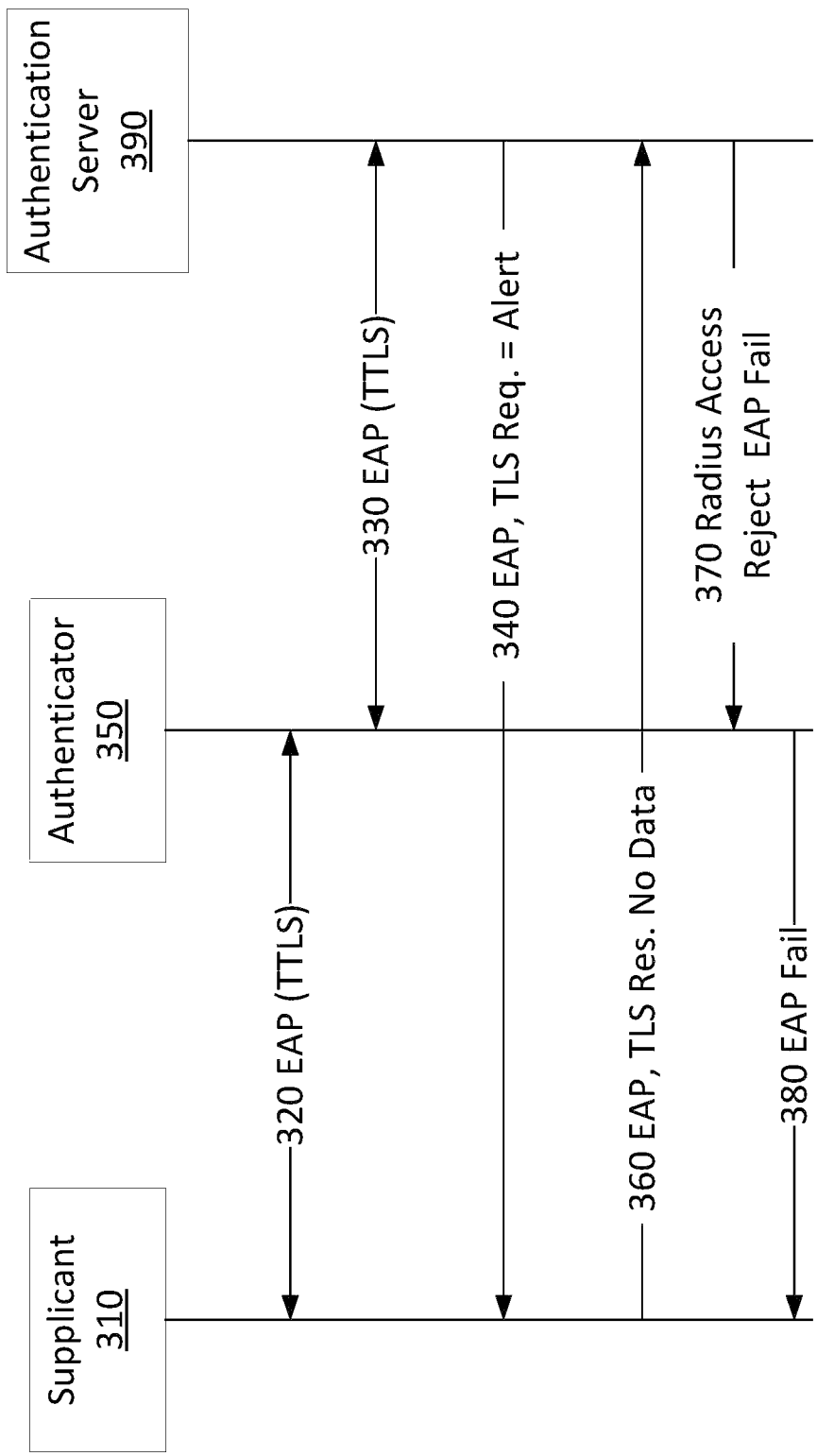
FIG. 3 is another message sequence diagram for a call flow illustrating example details that may be associated with an augmentation method for EAP failures, according to an example embodiment.

FIG. 3 is another message sequence diagram for a call flow illustrating example details that may be associated with an augmentation method for EAP failures, according to an example embodiment. FIG. 3 includes supplicant 310, authenticator 350, and authentication and authorization (AAA) server 390 that use yet another sequence of messages when supplicant 310 attempts to access a wireless network. Initially message 120 is communicated between supplicant 310 and Authenticator 350 and then authenticator 350 sends message 330 to authentication server 390 such that authentication server 390 can perform functions associated with authentication supplicant 310 and potentially authorizing supplicant 310 to access a wireless network. Messages 320 and 330 may be EAP-TTLS messages that initiate an authentication process at the AAA server.

A secure tunnel may then be created that may be used to send secure messages between AAA server 390 and supplicant 310. Message 340 may be sent via this secure tunnel to supplicant 310 and message 340 may include an alert that identifies a failure code or reason why an authentication of supplicant 310 failed. As mentioned above, the supplicant 310 may send a reply (or response) message 360 that acts as an acknowledgement of the receipt of message 340. Reply message 360 may not include data. Message 370 may then be sent to authenticator 350 and authenticator 350 may then send message 380 to supplicant 310. Message 370 may be a (RADIUS) access-reject message and message 380 may be an EAP failure message sent to supplicant 310 that includes no failure code/reason. Supplicant 310 may then evaluate the failure code or reason included in message 340 and then attempt to connect to the wireless network again. Here again supplicant may modify data sent to AAA server 390 in a second attempt to access the wireless network.

Exemplary data/codes that may be included in alert message 340 may include: enum {warning(1), fatal(2), (255)} AlertLevel, close_notify(0); unexpected_message(10); bad_record_mac(20); decryption_failed_Reserved(21); record_overflow(22); decompression_failure(30); handshake_failure(40); no_certificate_Reserved(41); bad_certificate (42); unsupported_certificate(43); certificate_revoked (44); certificate_expired(45); certificate_unknown(46); illegal_parameter(47); unknown_ca(48); access_denied (49); decode_error(50); decrpt_error(51); expor_rrestrition_insufficient_security(71); internal_error(80); user_cancelled (90); no-renegotiation(100); unspuuprted_extension(110); and /*new*/(255) AlertDescription.

Additionally, RFC 5281 and draft-rfced-info-zorn-01 can be augmented with new MS-CHAP error attributes. Thus, using EAP-TTLS, upon encountering one of the errors listed in Part A above, the AAA returns an EAP-Request (via a protected tunnel) of type access-challenge, that includes one of the errors in Part A as the error attribute Attribute-Value-Pair (AVP). The supplicant is now informed of the reasons of the failure (authentication or authorization). The AAA then sends the Access-Reject+EAP Failure to the authenticator, who replays the EAP-Failure message to the supplicant as per current usage. Various example details associated with such augmenting for Method 2 involving RFC 5282 and draft-rfced-info-zorn-01 are illustrated with reference to the call flow of FIG. 4.

Figure 4:
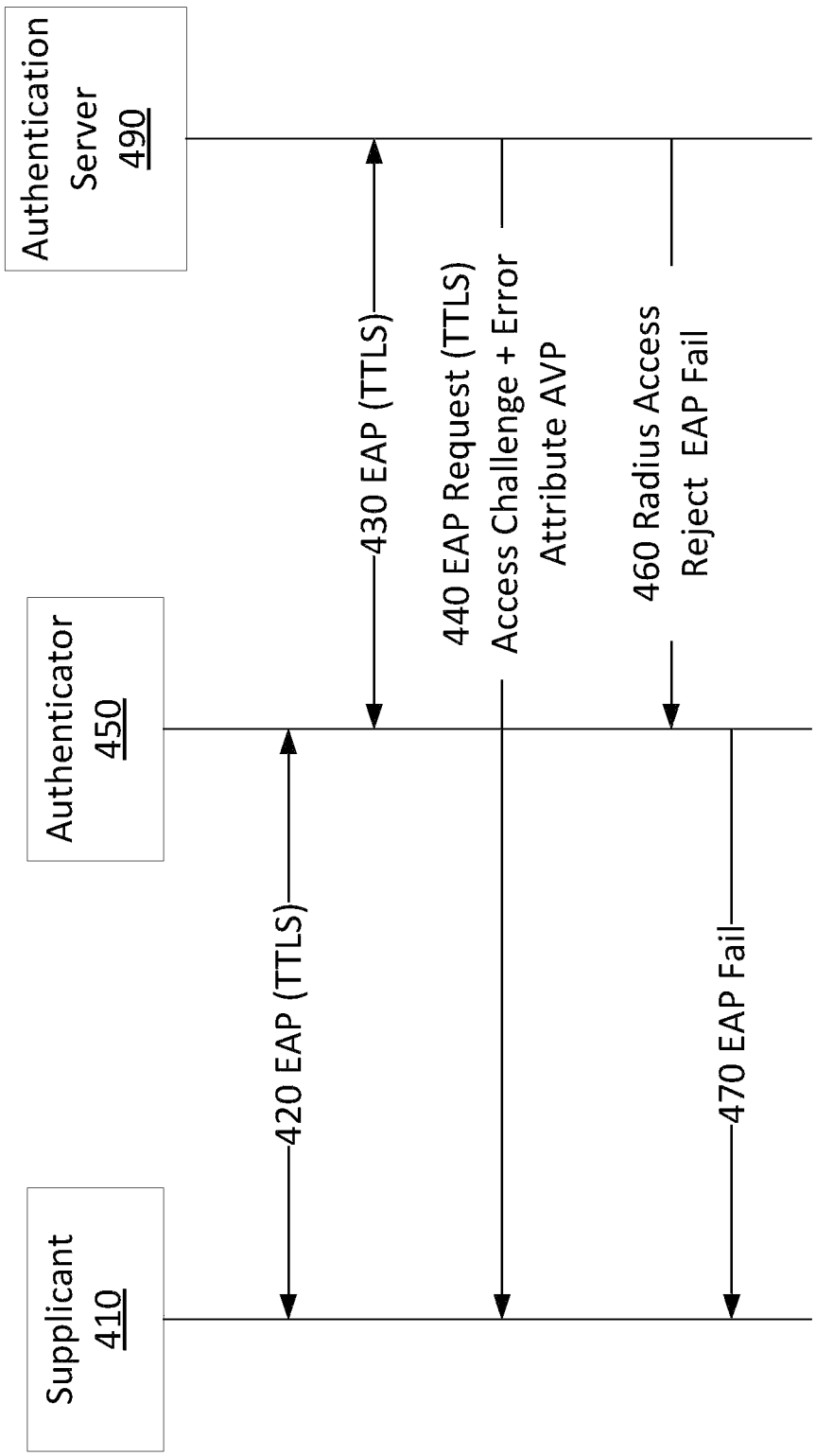
FIG. 4 is another message sequence diagram for a call flow illustrating example details that may be associated with an augmentation method for EAP failures, according to an example embodiment.

FIG. 4 is another message sequence diagram for a call flow illustrating example details that may be associated with an augmentation method for EAP failures, according to an example embodiment. FIG. 4 includes supplicant 410, authenticator 450, and authentication and authorization (AAA) server 490 that use yet another sequence of messages when supplicant 410 attempts to access a wireless network. Initially message 420 is communicated between supplicant 410 and Authenticator 450 and then authenticator 450 sends message 430 to authentication server 490 such that authentication server 490 can perform functions associated with authentication supplicant 410 and potentially authorizing supplicant 410 to access a wireless network. Messages 420 and 430 may be EAP-TTLS messages that initiate an authentication process at the AAA server.

A secure tunnel may then be created that may be used to send secure messages between AAA server 490 and supplicant 410. Message 440 may be sent via this secure tunnel to supplicant 410 and message 440 may include an EAP TTLS request via the tunnel that includes an access challenge, error data, and potentially an attribute value pair mentioned above. Message 440 may inform supplicant 410 of a reason why an authentication or authorization process failed at AAA server 490. Here again data that identifies the failure reason may be or include a code. AAA server 490 may then send message 460 that may be a (RADIUS) access-reject message and message 470 may be an EAP failure message send to supplicant 410 that includes no failure code/reason. Supplicant 410 may then evaluate the failure code or reason included in message 440 and then attempt to connect to the wireless network again. Here again supplicant may modify data sent to AAA server 490 in a second attempt to access the wireless network.

The attribute data sent in message 440 may include exemplary error attribute data of: 646 Error_Restricted_Logon_Hours; 647 Error_Acct_Disabled; 648 Error_Password_Expired; 649 Error_No_Dilin_Permission; 691 Error_Authentication_Failure; 709 Error_Changing_Passord, or some new or other error code, description, or classification.

It is noted that EAP-SIM/AKA/AKA' do not include reason code mechanisms or exchanges relevant to authorization, and that authentication failure only results from an AT_NOTIFICATION failure. As such, RFC 4186/RFC 4187/RFC 5448 can be augmented to insert the failure reason within the format of the Access challenge message, here as well containing the Error attribute. Further, the usage of the EAP Request structure is allowed with the Notification payload that contains the reject reason. The supplicant is now informed of the reasons of the failure (authentication or authorization). The AAA then sends the Access-Reject+ EAP Failure to the authenticator, who replays the EAP-Failure message to the supplicant as per current usage. Various example details associated with such augmenting for Method 2 involving RFC 4186 are illustrated with reference to the call flow of FIG. 5.

Figure 5:
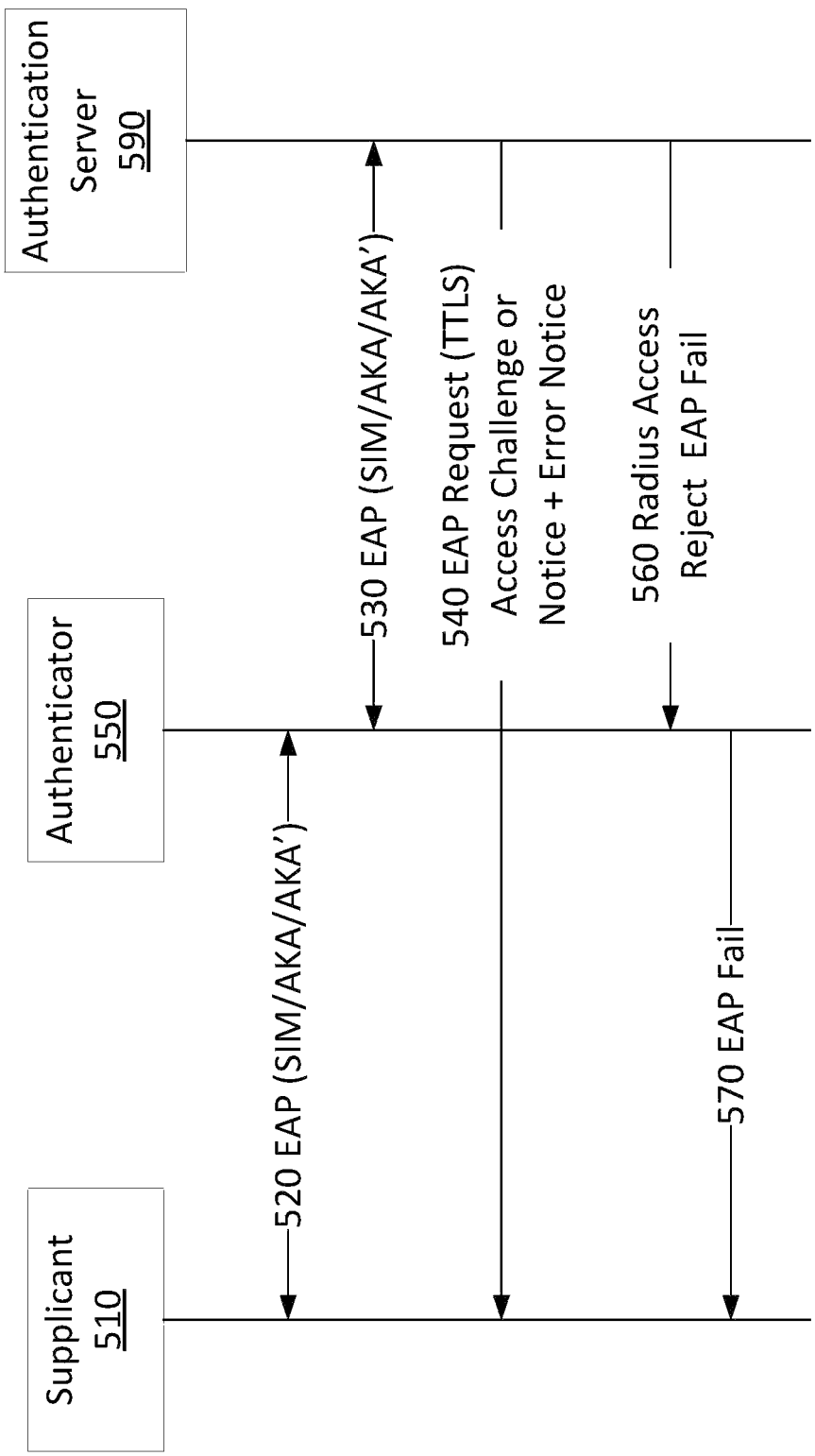
FIG. 5 is another message sequence diagram for a call flow illustrating example details that may be associated with an augmentation method for EAP failures, according to an example embodiment.

FIG. 5 is another message sequence diagram for a call flow illustrating example details that may be associated with an augmentation method for EAP failures, according to an example embodiment. FIG. 5 includes supplicant 510, authenticator 550, and authentication and authorization (AAA) server 590 that use yet another sequence of messages when supplicant 510 attempts to access a wireless network. FIG. 5 includes a sequence of messages that are very similar to the message sequence of FIG. 4, here however the EAP messages may be according to the EAP-SIM/AKA/AKA' model discussed above.

FIG. 5 includes message 520 that is communicated between supplicant 510 and Authenticator 550 and then authenticator 550 sends message 530 to authentication server 590 such that authentication server 590 can perform functions associated with authentication supplicant 510 and potentially authorizing supplicant 510 to access a wireless network. Messages 520 and 530 may be SIM/AKA/AKA' messages that initiate an authentication process at the AAA server.

A secure tunnel may then be created that may be used to send secure messages between AAA server 590 and supplicant 510. Message 540 may be sent via this secure tunnel to supplicant 510 and message 540 may include an EAP TTLS request via the tunnel that includes an access challenge or notification/notice and error notification/notice data. Message 540 may inform supplicant 510 of a reason why an authentication or authorization process failed at AAA server 590. Here again data that identifies the failure reason may be or include a code. AAA server 590 may then send message 560 that may be a (RADIUS) access reject message and message 570 may be an EAP failure message send to supplicant 510 that includes no failure code/reason. Supplicant 510 may then evaluate the failure code or reason included in message 540 and then attempt to connect to the wireless network again. Here again supplicant may modify data sent to AAA server 590 in a second attempt to access the wireless network.

Part B, Method 3. For Method 3, 802.11 networks are allowed to carry the rejection information. In this embodiment, the EAP exchange concludes as per current usage with an EAP Failure message from the authenticator (without a provided reason). Then the AP, which is also the authenticator (along with the associated wireless LAN controller (WLC)), is allowed to close the connection with a deauthentication or a deassociation message that contains new reasons codes (augmenting 802.11-2016, Section 9.4.1.7, table 9-45) with the new reason codes defined in Part A. Various example details associated with such augmenting for Method 3 are illustrated with reference to the call flow of FIG. 6.

Figure 6:
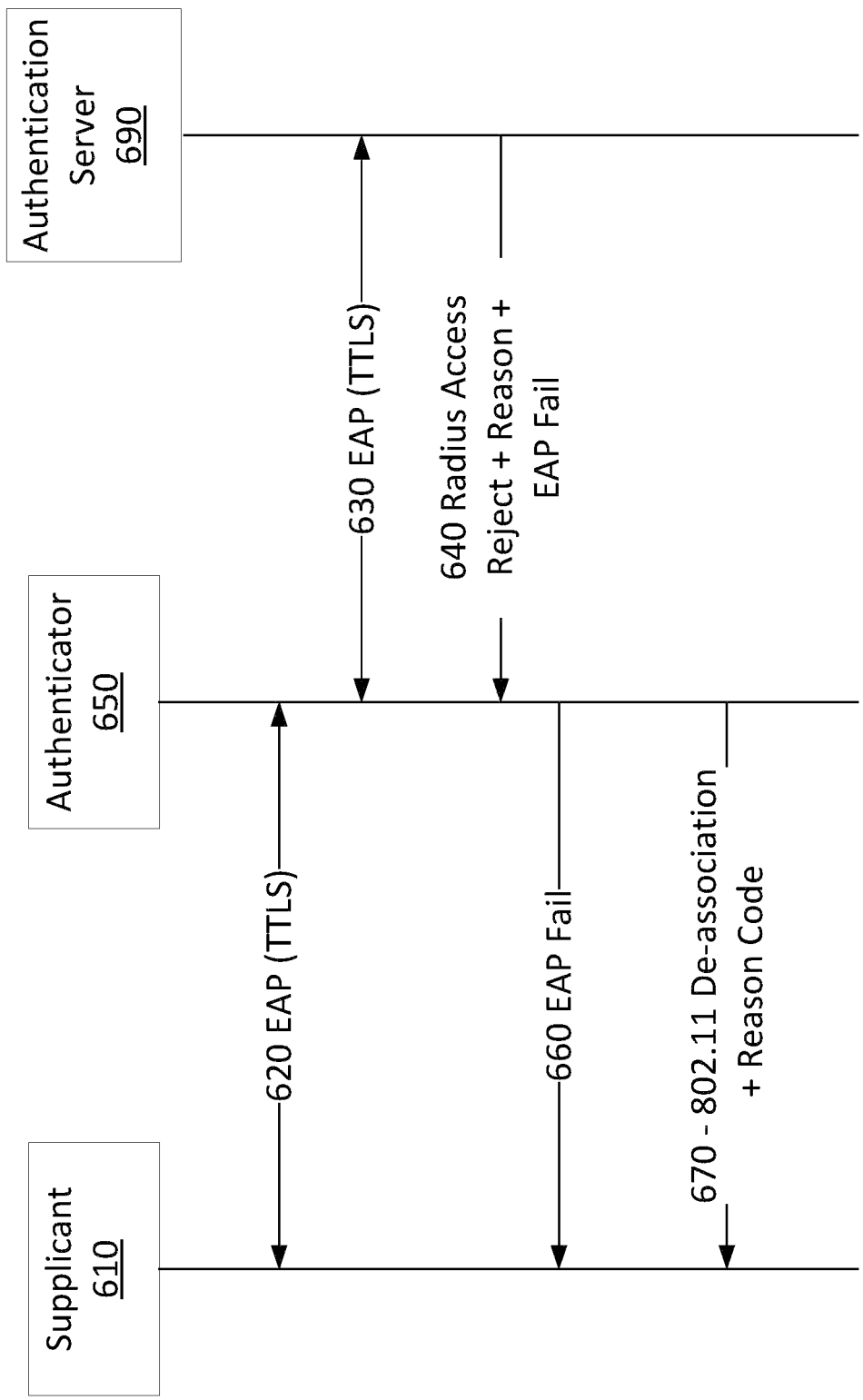
FIG. 6 is another message sequence diagram for a call flow illustrating example details that may be associated with an augmentation method for EAP failures, according to an example embodiment.

FIG. 6 is another message sequence diagram for a call flow illustrating example details that may be associated with an augmentation method for EAP failures, according to an example embodiment. FIG. 6 includes supplicant 610, authenticator 650, and authentication and authorization (AAA) server 690 that use yet another sequence of messages when supplicant 610 attempts to access a wireless network. FIG. 6 includes message 620 that is communicated between supplicant 610 and Authenticator 650 and then authenticator 650 then sends message 630 to authentication server 690 such that authentication server 690 can perform functions associated with authentication supplicant 610 and potentially authorizing supplicant 610 to access a wireless network. Messages 620 and 630 may be EAP-TTLS messages that initiate an authentication process at the AAA server.

Message 640 may then be sent from AAA server 690 to authenticator 650. Message 640 may be a (RADIUS) access-reject message that identifies that an authentication or authorization process has been rejected. Message 640 may include a failure reason and an EAP failure data. Next message 660 may be sent from authenticator 650 to supplicant 610. After message 660 is sent to supplicant 610, message 670 may be sent to supplicant 610 from authenticator 650. Message 670 may be a message that closes a communication connection with the supplicant 610. As discussed above this closing of the connection may include deauthentication or a deassociation message that contains new reasons codes (augmenting 802.11-2016, Section 9.4.1.7, table 9-45) with the new reason codes defined in Part A above, for example.

In certain instances, error codes provided to a supplicant computing device may result in messages being provided to a user of that supplicant computing device via a user interface. This may instruct the user to seek out help from an internet support staff at a company to help resolve an issue with their computer. For example, an error code indicating that a password of the user had expired may be displayed on a display of the computer along with a message to call the helpdesk at their company. This could then allow an internet support person the update the password of the user.

In all the cases discussed with reference to Part B, it is envisioned that the failure may be accompanied by a timer ('do not retry for N seconds', e.g., 3600). In some embodiments, this additional information may be used by the UE to better refine its behavior (e.g., possibly retrying after the timer value, with the preferred profile).

As referred to herein, an access point may include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over-the-air RF connections for one or more elements of a system.

In various embodiments, a UE may be associated with any user, subscriber, employee, client, customer, electronic device, etc. wishing to initiate a flow in the system and may be inclusive of any device that initiates a communication in the system, such as a computer, an electronic device such as an industrial device, automation device, enterprise device, appliance, Internet of Things (IoT) device, etc., a laptop or electronic notebook, a cellular/Wi-Fi enabled telephone/smart phone, tablet, etc. and/or any other device, component, element, or object capable of initiating voice, audio, video, media, or data exchanges within the system. A UE may include any combination of hardware (e.g., communications units, receiver(s), transmitter(s), antenna(s) and/or antenna array(s), processor(s), memory element(s), baseband processor(s) (modems), etc.)], controllers (e.g., wireless local area network controllers, etc.), software, logic, and/or any other elements/entities that may facilitate over the-air RF connections with one or more access networks/access points.

Figure 7:
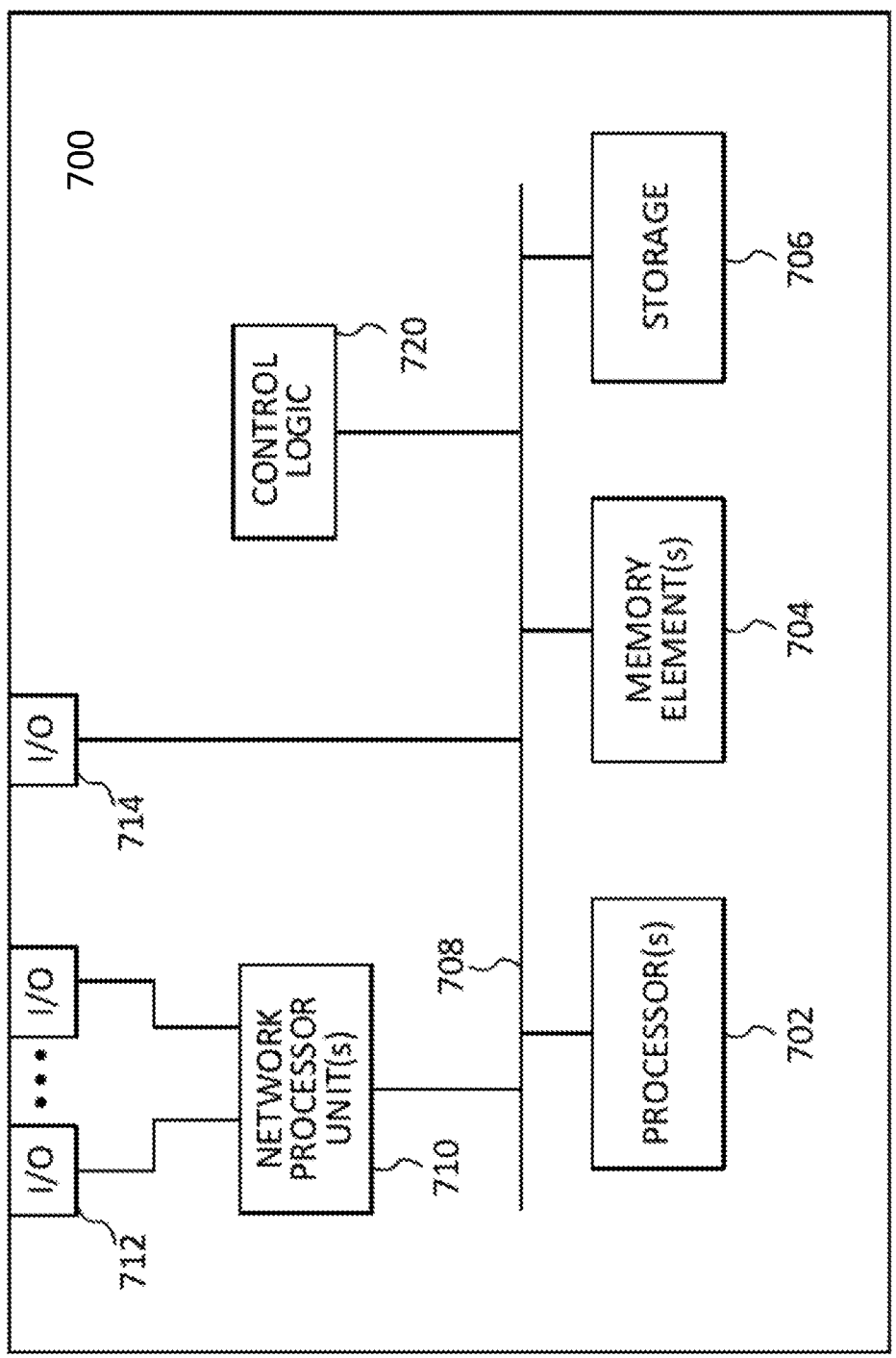
FIG. 7 is a hardware block diagram of a computing device that may perform functions associated with any combination of operations discussed herein.

In summary, techniques herein define new reasons for an IdP rejecting a supplicant in the context of a Federation. Further defined are 3 methods for the rejection reason to be transmitted to a UE, thus avoiding that the UE would retry profiles that would always fail, and thus allowing the UE to better arbitrate between retry, wait, switch profile or switch SSID. In various embodiments, the techniques presented herein may be inserted into Wi-Fi Alliance Passpoint certification and applicable 802.11 standards Referring to FIG. 7, FIG. 7 illustrates a hardware block diagram of a computing device 700 that may perform functions associated with operations discussed herein. In various embodiments, a computing device, such as computing device 700 or any combination of computing devices 700, may be configured as any entity/entities as discussed for the techniques discussed herein in order to perform operations of the various techniques discussed herein.

In at least one embodiment, computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device. Processor(s) 702 (e.g., hardware processor(s)) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Figure 8:
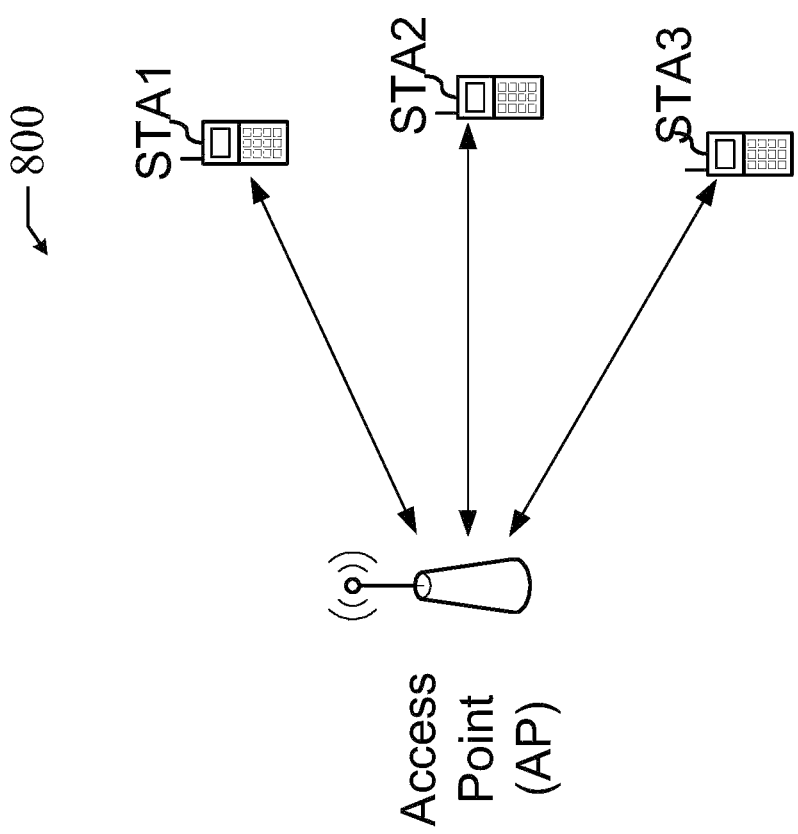
FIG. 8 illustrates an example wireless communication network in which some aspects of the technology can be implemented.

FIG. 8 illustrates an example wireless communication network 800 in which some aspects of the technology can be implemented. The wireless communication network 800 can form an enterprise wireless network. In turn, the systems and techniques described herein can be utilized in controlling link selection and aggregation across the wireless communication network 800 and another network.

The wireless communication network 200 includes an Access Point (AP), configured for wireless communication with multiple receivers or client devices (e.g., STA1, STA2, and STA3). It is understood that additional (or fewer) STAs and/or APs could be implemented in network 200, without departing from the scope of the technology. The STAs and AP shown in FIG. 2 can be configured to form a WiFi network. A WiFi network, as used herein, is a network that is formed in maintained in accordance with the Institute of Electrical and Electronics Engineers (IEEE) 802.11 family of standards. Specifically, the AP and the STAs can wirelessly communicate with each other according to the IEEE 802.11 family of standards to form a WiFi network. The AP of FIG. 8 may perform the functions of the authenticator computing devices (e.g. 150, 250, 350, 450, 550, and 650) of FIGS. 1-6. Each of the client devices (e.g. STA1, STA2, and STA2) of FIG. 8 may perform the function of supplicant computing devices (e.g. 110, 210, 310, 410, 510, & 610) of FIGS. 1-6.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area network (WLAN), wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment.

Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:
1. A computer-implemented method comprising:
receiving an Extensible Authentication Protocol (EAP) request generated by a supplicant for accessing network services through a network environment, wherein the EAP request corresponds to a device profile;
identifying that the supplicant has failed either or both authentication for the network environment and autho- rization for the network environment that are initiated based on the EAP request; and facilitating transmission of a message coupled with a Remote Authentication Dial-In User service (RADIUS) Access-Reject message to a device of the supplicant including a failure indication of one or more reasons that the supplicant failed either or both authentication and authorization for the network environment, the message securely provided to the device of the supplicant to prevent a retry from the supplicant of a same type of EAP request corresponding to the device profile by providing the failure reason to the device;

receiving a different course of action from the device of the supplicant subsequent to the transmission of the message, wherein the different course of action includes successfully authenticating an identity of the device of the supplicant.

2. The computer-implemented method of claim 1, wherein the message is sent as an authentication message.

3. The computer-implemented method of claim 2, wherein the supplicant failed authorization for the network environment and the failure indication of a reason that the supplicant failed authorization for the network environment is sent in the authentication message.

4. The computer-implemented method of claim 1, wherein the network environment includes a WiFi compliant wireless network through which the supplicant is attempting to access the network services.

5. The computer-implemented method of claim 1, wherein the message is generated by an authentication server and transmitted to the supplicant through an authenticator.

6. The computer-implemented method of claim 1, wherein the message is generated by an authenticator coupled between the supplicant and an authentication server and the authenticator is configured to generate the message and transmit the message to the supplicant.

7. The computer-implemented method of claim 6, wherein the authenticator is configured to transmit the message to the supplicant as part of a network de-association message.

8. The computer-implemented method of claim 1, wherein the network environment utilizes pre-association security and the message is sent as a rejection cause hint independently of an EAP response message transmitted to the supplicant.

9. The computer-implemented method of claim 1, wherein the message includes one or more codes indicating the one or more reasons that the supplicant failed either or both authentication and authorization and the message is included in an EAP response message transmitted to the supplicant.

10. The computer-implemented method of claim 1, further comprising:
sending an access challenge to the supplicant in response to receiving the EAP request; and
receiving an access challenge response from the supplicant.

11. The computer-implemented method of claim 10, wherein an error message is included in an access challenge rejection.

12. The computer-implemented method of claim 1, wherein the failure indication includes one or more keys indicative of at least one of an authentication failure, a failure before authentication, a no service subscription failure, a roaming not allowed in the network environment failure, a Quality of Service failure, a no credit failure, and a temporary denial failure.

13. A system comprising:
one or more processors; and
at least one computer-readable storage medium having stored therein instructions which, when executed by the one or more processors, cause the one or more processors to perform operations comprising:
receiving an Extensible Authentication Protocol (EAP) request generated by a supplicant for accessing network services through a network environment, wherein the EAP request corresponds to a device profile;
identifying that the supplicant has failed authorization for the network environment that is initiated based on the EAP request; and
facilitating transmission of a message coupled with a Remote Authentication Dial-In User service (RADIUS) Access-Reject message to a device of the supplicant including a failure indication of one or more reasons that the supplicant failed authorization for the network environment, the message securely provided to the device of the supplicant to prevent a retry from the supplicant of a same type of EAP request corresponding to the device profile by providing the failure reason to the device;
receiving a different course of action from the device of the supplicant subsequent to the transmission of the message, wherein the different course of action includes successfully authenticating an identity of the device of the supplicant.

14. The system of claim 13, wherein the message is sent as an authentication message.

15. The system of claim 13, wherein the message is generated by an authentication server and transmitted to the supplicant through an authenticator.

16. The system of claim 13, wherein the network environment includes a WiFi compliant wireless network through which the supplicant is attempting to access the network services.

17. The system of claim 13, wherein the message is generated by an authenticator coupled between the supplicant and an authentication server and the authenticator is configured to generate the message and transmit the message to the supplicant.

18. The system of claim 17, wherein the authenticator is configured to transmit the message to the supplicant as part of a network de-association message.

19. The system of claim 13, wherein the network environment utilizes pre-association security and the message is sent as a rejection cause hint independently of an EAP response message transmitted to the supplicant.

20. A non-transitory computer-readable storage medium having stored therein instructions which, when executed by a processor, cause the processor to perform operations comprising:
receiving an Extensible Authentication Protocol (EAP) request generated by a supplicant for accessing network services through a network environment over a WiFi connection, wherein the EAP request corresponds to a device profile;
identifying that the supplicant has failed either or both authentication for the network environment and authorization for the network environment that are initiated based on the EAP request; and
facilitating transmission of a message coupled with a Remote Authentication Dial-In User service (RADIUS)

Access-Reject message to a device of the supplicant including a failure indication of one or more reasons that the supplicant failed either or both authentication and authorization for the network environment, the message securely provided to the device of the supplicant to prevent a retry from the supplicant of a same type of EAP request corresponding to the device profile by providing the failure reason to the device;

receiving a different course of action from the device of the supplicant subsequent to the transmission of the message, wherein the different course of action includes successfully authenticating an identity of the device of the supplicant.

\* \* \* \* \*